US010230529B2

(12) United States Patent
Costa et al.

(10) Patent No.: US 10,230,529 B2
(45) Date of Patent: Mar. 12, 2019

(54) TECHNIQUES TO SECURE COMPUTATION DATA IN A COMPUTING ENVIRONMENT

(71) Applicant: MICROSOFT TECHNOLOGY LICENSING, LLC, Redmond, WA (US)

(72) Inventors: Manuel Costa, Cambridge (GB); Orion Tamlin Hodson, Cambridge (GB); Sriram Kottarakurichi Rajamani, Bangalore (IN); Marcus Peinado, Bellevue, WA (US); Mark Eugene Russinovich, Hunts Point, WA (US); Kapil Vaswani, London (GB)

(73) Assignee: MICROSFT TECHNOLOGY LICENSING, LLC, Redmond, WA (US)

( * ) Notice: Subject to any disclaimer, the term of this patent is extended or adjusted under 35 U.S.C. 154(b) by 68 days.

(21) Appl. No.: 14/865,570

(22) Filed: Sep. 25, 2015

(65) Prior Publication Data

US 2017/0033930 A1    Feb. 2, 2017

(30) Foreign Application Priority Data

Jul. 31, 2015    (IN) .......................... 3995/CHE/2015

(51) Int. Cl.
*G06F 21/60*    (2013.01)
*H04L 29/06*    (2006.01)
(Continued)

(52) U.S. Cl.
CPC .......... *H04L 9/3247* (2013.01); *G06F 9/5072* (2013.01); *G06F 21/606* (2013.01);
(Continued)

(58) Field of Classification Search
CPC ... H04L 9/0816; H04L 9/0822; H04L 9/0825; H04L 63/12; G06F 21/62; G06F 21/6236; G06F 21/606; G06F 21/64
See application file for complete search history.

(56) References Cited

U.S. PATENT DOCUMENTS

| 5,757,919 A | * | 5/1998 | Herbert | G06F 12/1408 380/30 |
| 8,656,482 B1 | * | 2/2014 | Tosa | H04L 63/08 713/153 |

(Continued)

OTHER PUBLICATIONS

Evtyushkin, et al., "Iso-X: A Flexible Architecture for Hardware-Managed Isolated Execution", In Proceedings of International Symposium on Microarchitecture, Dec. 13, 2014, 13 pages.
(Continued)

*Primary Examiner* — Nelson Giddins
(74) *Attorney, Agent, or Firm* — Alleman Hall Creasman & Tuttle LLP

(57) ABSTRACT

Techniques to secure computation data in a computing environment from untrusted code. These techniques involve an isolated environment within the computing environment and an application programming interface (API) component to execute a key exchange protocol that ensures data integrity and data confidentiality for data communicated out of the isolated environment. The isolated environment includes an isolated memory region to store a code package. The key exchange protocol further involves a verification process for the code package stored in the isolated environment to determine whether the one or more exchanged encryption keys have been compromised. If the signature successfully authenticates the one or more keys, a secure communication channel is established to the isolated environment and access to the code package's functionality is enabled. Other embodiments are described and claimed.

20 Claims, 13 Drawing Sheets

(51) Int. Cl.
*H04L 9/32* (2006.01)
*G06F 9/50* (2006.01)
*G06F 21/62* (2013.01)

(52) U.S. Cl.
CPC .......... *G06F 21/62* (2013.01); *G06F 21/6236* (2013.01); *H04L 63/06* (2013.01); *H04L 63/08* (2013.01); *H04L 63/12* (2013.01)

(56) References Cited

U.S. PATENT DOCUMENTS

| | | | | |
|---|---|---|---|---|
| 8,694,795 B1* | 4/2014 | Aissi | G06F 21/30 | 713/187 |
| 8,977,842 B1* | 3/2015 | McCorkendale | G06F 21/53 | 380/285 |
| 2003/0188183 A1* | 10/2003 | Lee | G06F 21/10 | 726/30 |
| 2006/0020781 A1* | 1/2006 | Scarlata | G06F 21/53 | 713/100 |
| 2007/0179904 A1* | 8/2007 | Hofstee | G06F 21/57 | 705/67 |
| 2008/0022129 A1* | 1/2008 | Durham | G06F 21/54 | 713/189 |
| 2008/0086641 A1* | 4/2008 | Rodgers | H04L 9/0891 | 713/176 |
| 2008/0104706 A1* | 5/2008 | Karp | H04L 63/0428 | 726/26 |
| 2009/0290712 A1* | 11/2009 | Henry | G06F 21/72 | 380/277 |
| 2009/0323941 A1* | 12/2009 | Sahita | G06F 21/53 | 380/44 |
| 2010/0281273 A1* | 11/2010 | Lee | G06F 21/72 | 713/190 |
| 2011/0296201 A1* | 12/2011 | Monclus | G06F 21/53 | 713/190 |
| 2011/0302400 A1* | 12/2011 | Maino | G06F 21/575 | 713/2 |
| 2011/0302415 A1* | 12/2011 | Ahmad | G06F 21/57 | 713/168 |
| 2012/0179904 A1* | 7/2012 | Dunn | G06F 21/6209 | 713/155 |
| 2012/0265976 A1* | 10/2012 | Spiers | H04L 63/0218 | 713/2 |
| 2012/0324446 A1* | 12/2012 | Fries | G06F 21/64 | 718/1 |
| 2013/0085880 A1* | 4/2013 | Roth | G06F 21/602 | 705/26.1 |
| 2013/0151846 A1* | 6/2013 | Baumann | H04L 9/3263 | 713/156 |
| 2013/0152209 A1* | 6/2013 | Baumann | G06F 21/53 | 726/26 |
| 2013/0276091 A1* | 10/2013 | Saxena | H04L 63/029 | 726/11 |
| 2013/0276146 A1* | 10/2013 | Gilani | H04L 63/10 | 726/29 |
| 2013/0279691 A1* | 10/2013 | Chen | H04L 9/0822 | 380/44 |
| 2013/0283380 A1* | 10/2013 | Thadikaran | H04L 63/145 | 726/23 |
| 2013/0290694 A1* | 10/2013 | Civilini | H04L 41/0806 | 713/2 |
| 2013/0291070 A1* | 10/2013 | Triantafillou | H04L 63/08 | 726/4 |
| 2013/0332937 A1* | 12/2013 | Gaster | G06F 9/5072 | 718/104 |
| 2014/0032920 A1* | 1/2014 | Gehrmann | G06F 21/57 | 713/176 |
| 2014/0093083 A1* | 4/2014 | Dadu | G06F 21/62 | 380/275 |
| 2014/0137115 A1* | 5/2014 | Tosa | H04L 63/08 | 718/1 |
| 2015/0058997 A1* | 2/2015 | Lee | G06F 9/45558 | 726/26 |
| 2015/0082304 A1* | 3/2015 | Hepkin | G06F 21/53 | 718/1 |
| 2015/0089502 A1* | 3/2015 | Horovitz | G06F 9/45545 | 718/1 |
| 2015/0220745 A1* | 8/2015 | Nellitheertha | G06F 15/16 | 713/193 |
| 2015/0256341 A1* | 9/2015 | Ye | H04L 41/0803 | 713/164 |
| 2015/0304736 A1* | 10/2015 | Lal | G06F 21/10 | 380/210 |
| 2015/0319144 A1* | 11/2015 | Barton | H04L 63/0428 | 713/168 |
| 2015/0319160 A1* | 11/2015 | Ferguson | H04L 9/0894 | 726/10 |
| 2016/0191499 A1* | 6/2016 | Momchilov | H04L 63/0815 | 713/171 |
| 2016/0234176 A1* | 8/2016 | Chu | H04L 63/0428 | |
| 2016/0306978 A1* | 10/2016 | Thadikaran | G06F 21/575 | |
| 2016/0330214 A1* | 11/2016 | Roth | G06F 21/602 | |
| 2016/0364341 A1* | 12/2016 | Banginwar | G06F 12/145 | |
| 2017/0004001 A1* | 1/2017 | Bacher | G06F 9/45558 | |
| 2017/0054696 A1* | 2/2017 | Roth | H04L 63/0428 | |
| 2017/0222815 A1* | 8/2017 | Meriac | G06F 21/554 | |

OTHER PUBLICATIONS

Naruchitparames, et al., "Enhancing Data Privacy and Integrity in the Cloud", In Proceedings of International Conference on High Performance Computing and Simulation, Jul. 4, 2011, 7 pages.

Parno, Bryan, "Trust Extension for Commodity Computers", In Proceedings of Communications of the ACM, vol. 55, Jun. 2012, 8 pages.

Baumann, et al., "Shielding applications from an untrusted cloud with Haven", In Proceedings of 11th USENIX Symposium on Operating Systems Design and Implementation, Oct. 6, 2014, 19 pages.

Krude, et al., "A Versatile Code Execution Isolation Framework with Security First", In Proceedings of the ACM Workshop on Cloud Computing Security Workshop, Nov. 8, 2013, 10 pages.

"Amazon Web Services: Overview of Security Processes", In Whitepaper, Jun. 2014, 68 pages.

Tan et al., "Poster: Towards Secure Execution of Untrusted Code for Mobile Edge-Clouds", In Proceedings of 7th ACM Conference on Security and Privacy in Wireless and Mobile Networks, Jul. 23, 2014, 2 pages.

Zhang, et al., "Cloud Visor: Retrofitting Protection of Virtual Machines in Multi-tenant Cloud with Nested Virtualization", In Proceedings of 23rd ACM Symposium on Operating Systems Principles, Oct. 23, 2011, pp. 203-216.

Chen, et al., "Overshadow: A Virtualization-Based Approach to Retrofitting Protection in Commodity Operating Systems", In Proceedings of 13th International Conference on Architectural Support for Programming Languages and Operating Systems, Mar. 1, 2008, 12 pages.

Hofmann, et al., "Ink Tag: Secure Applications on an Untrusted Operating System", In Proceedings of 18th International Conference on Architectural Support for Programming Languages and Operating Systems, Mar. 16, 2013, 14 pages.

Ta-Min, et al., "Splitting Interfaces: Making Trust Between Applications and Operating Systems Configurable", In Proceedings of the 7th USENIX symposium on Operating systems design and implementation, Nov. 6, 2006, 14 pages.

Yang, et al., "Using Hypervisor to Provide Data Secrecy for User Applications on a Per-Page Basis", In Proceedings of the 4th International Conference on Virtual Execution Environments, Mar. 5, 2008, 10 pages.

"Software Guard Extensions Programming Reference", Published on: Sep. 2013 Available at: http://software.intel.com/sites/default/files/329298-001.pdf.

(56) References Cited

OTHER PUBLICATIONS

"International Search Report and Written Opinion Issued in PCT Application No. PCT/US2016/042381", dated Dec. 21, 2017, 23 Pages.

* cited by examiner

*900*

GENERATE ISOLATED MEMORY REGION IN A COMPUTING ENVIRONMENT AND STORE CODE PACKAGE
902

GENERATE A SIGNATURE USING A PRIVATE ATTESTATION KEY
904

EXECUTE A VERIFICATION PROCESS TO ACCESS THE CODE PACKAGE IN THE ISOLATED MEMORY REGION
906

COMMUNICATE A VERIFICATION RESULT TO A REMOTE MACHINE
908

STORE SECURED DATA IN A CLOUD FILE SYSTEM AND COMMUNICATE CONTROL CODES TO UNTRUSTED CODE
910

ENCRYPT SECRET CODE PACKAGE AND COMMUNICATE TO A COMPUTING ENVIRONMENT WITH A PUBLIC KEY
1102

PROCESS A MESSAGE COMPRISING SIGNED DATA AND EXECUTE A MECHANISM TO VERIFY THE SIGNED DATA
1104

1106 → REJECT CONNECTION 1108

DECRYPT AN ENCRYPTION KEY IN THE MESSAGE AND SECURE USER KEYS FOR COMMUNICATION TO THE TRUSTED CODE
1110

*FIG. 11*

TECHNIQUES TO SECURE COMPUTATION DATA IN A COMPUTING ENVIRONMENT

CROSS-REFERENCE TO RELATED APPLICATIONS

The application claims the benefit of and priority to, previously filed Indian application serial number 3995/CHE/2015 entitled "TECHNIQUES TO SECURE COMPUTATION DATA IN A COMPUTING ENVIRONMENT" filed on Jul. 31, 2015, the subject matter of which is hereby incorporated by reference in its entirety.

BACKGROUND

It has become increasingly important for developers (e.g., software application developers) to ensure data confidentiality and data integrity for their uses, especially when their programs involve sensitive data. Sophisticated security threats cost governments and private organizations considerable sums of capitol from delays and expenditures for preventing/mitigating these threats. As these organizations shift towards using cloud-based services over a network and away from maintaining on-premises hardware, an adversary has more opportunities to exploit a software vulnerability and jeopardize the security of other organizations. Due to the cloud computing environment's hierarchical privilege structure, programs that operate on such computing bases may inherit software vulnerabilities from privileged software code, such as an operating system component or a hypervisor component.

Various code-partitioning schemes provide a considerable number of opportunities for malicious attacks and reduce the benefits and practicality of executing these portions in a separate execution environment with a different privilege level. Large amounts of trusted code also inhibit any meaningful examination as to correctness. Furthermore, the code-partitioning schemes often require substantially manual tasks that prove to be error-prone and slow.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to provide secure computation in a computing environment via secure hardware abstraction. As described herein, the computing environment is controlled by a secure computation provider and may refer to a cloud-based environment or an on-premises (e.g., local) computing environment. The secure computation provider generally includes suitable secure hardware components, such as a secure processor. In an isolated memory region of the computing environment, a code package may be stored that is secure hardware-agnostic and operates with any secure computation provider. According to the various embodiments described herein, techniques that use signed data to verify the code package as being trusted code and authenticate message data originating from the isolated memory region enable secure computation by different providers. The message data generated by the code package can be used to share secrets between trusted code in the isolated memory region and remotely stored trusted code in a remote machine using various mechanisms such as those described herein and also encompassing those with similar features.

Some embodiments are particularly directed to techniques to enable access to the code package stored in the isolated memory region. The code package may implement functionality configured to execute a set of computations on data stored in external storage. Providing secure computation for the code package involves isolating part or all of the package's data and code from the untrusted code components (e.g., privileged software, such as an operating system component or a virtual machine monitor component) while maintaining a primitive programming model for communications between the isolated memory region and the untrusted code components. In general, the primitive programming model is an abstraction of underlying (secure) hardware that still provides secure computation over stored data. Secure computation may be enhanced by establishing one or more secure communication channels between the isolated code package and one or more remote trusted components running on remote machines. Because the isolated code package operates independently from underlying hardware, software and/or firmware, the various embodiments described herein can be implemented in any hardware configuration.

In one embodiment, for example, an apparatus may comprise logic operative on a logic circuit to configure an isolated memory region in a computing environment for secure communications with code running outside of the isolated memory region, generate signed data using an attestation key that corresponds to the computing environment, the signed data comprising a secured encryption key and a signature to authenticate the secured encryption key, and communicate the signed data to a remote trusted component to access secret code stored in the isolated memory region. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 9 illustrates an embodiment of a logic flow for the system of FIG. 1.

FIG. 11 illustrates an embodiment of a logic flow for the remote trusted component of FIG. 4.

DETAILED DESCRIPTION

Figure 1:
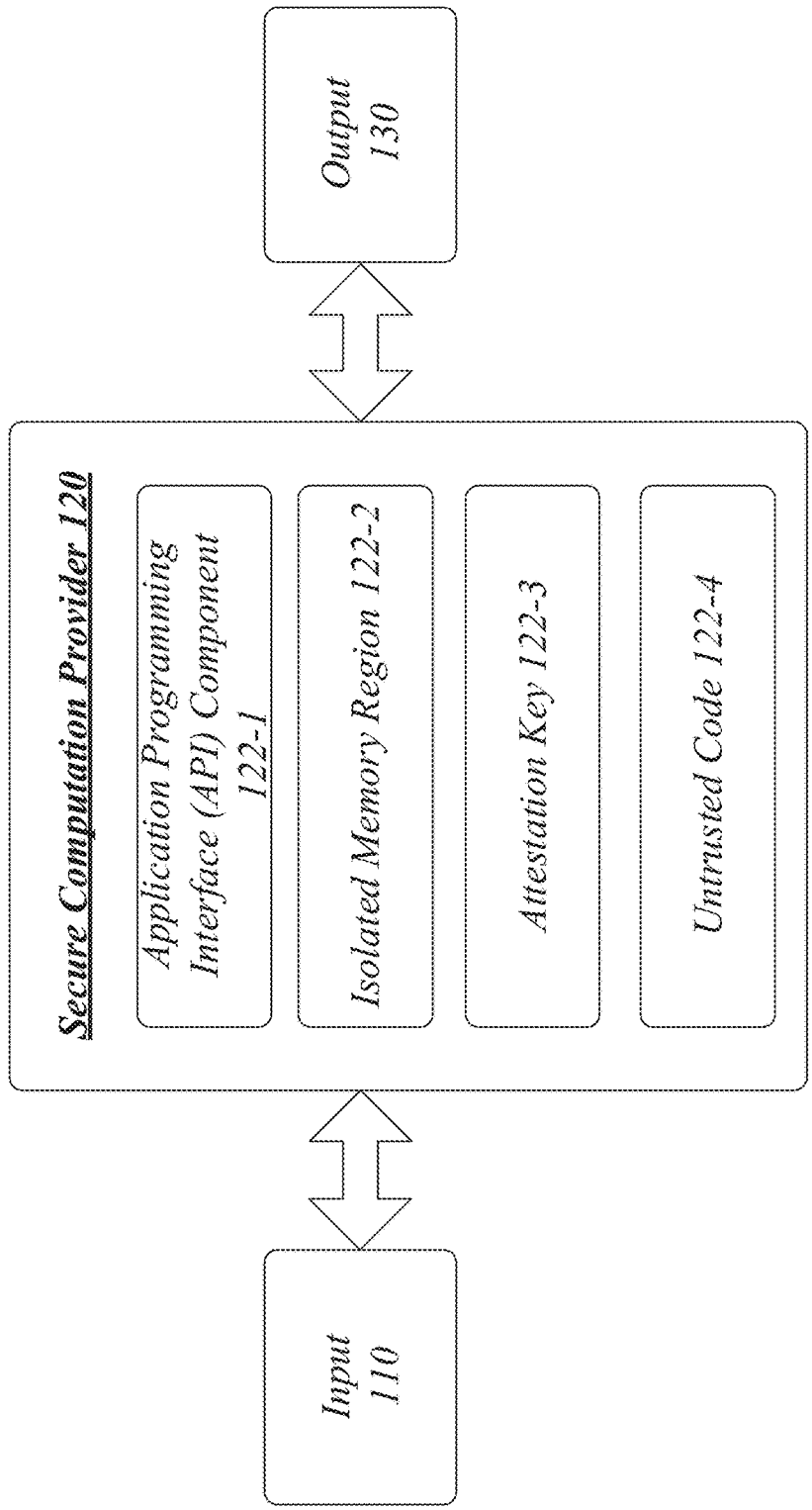
FIG. 1 illustrates an embodiment of a system to secure computation data in a computing environment.

Various embodiments are directed to an application programming interface (API) component in a computing environment that is operative to isolate trusted code from untrusted code in the computing environment and secure data generated by that trusted code when such data is being processed by the untrusted code. The API component, in general, provides a secure hardware abstraction layer by implementing a primitive programming model through which the untrusted code and the trusted code establish a secure connection or communication channel Both untrusted code and trusted code can use primitive functions of the primitive programming model to generate and manage an isolated environment. Via the primitive programming model, the trusted code implements an encryption protocol for securing network data traffic between the isolated environment and the untrusted code.

As described herein, the isolated environment may include various computer code and data stored in an isolated memory region of a computing device's memory. In some embodiments, the primitive programming model of the API component is used by the untrusted code to configure the isolated memory region with secure communication channels to code that is executable in memory region that is different from the isolated memory region, including privileged code components running outside of the isolated memory region. The primitive programming model may enable, among others, secure communication of the data to the untrusted code for processing by one of the untrusted code's functions, for storage in external storage, and/or for transmission to a remote machine over a network. The primitive programming model implemented by the API component may also enable additional management functions, such as file system operations, threading, synchronization, memory allocation and/or the like. In some embodiments, computation data is communicated with a signature (or another authentication code) to a remote machine and is secured with an encryption key that is generated through the primitive programming model. The signature ensures the integrity of the encryption key and verifies to the remote machine that the computer code in the isolated memory region has not been compromised or corrupted.

Application development frameworks (e.g., secure Hadoop) partition their data and code such that a portion is isolated from privileged software (e.g., the operating system) but require compatibility with underlying hardware within the computing environment. The primitive programming model of the API component provides interoperability with any underlying hardware. In some embodiments, the API component implements functions that produce communication primitives to communicate data securely. Although some of these communication primitives may incorporate or resemble known inter-process communication primitives, the embodiments envisioned by the present disclosure are not restricted to any particular construct. The API component implements a minimal number of functions to achieve secure computation and secure communication while limiting access to the isolated memory region only to code in that region. Hence, even if the privileged software is compromised or operated by a malicious administrator, the attackers cannot access the data and code in the isolated memory region.

As a result, the embodiments can improve affordability, scalability, modularity, extendibility, or interoperability for an operator, device or network.

We describe how the untrusted code in the cloud creates an isolated region with some code provided by the user, and how the trusted code inside the isolated region communicates with the code outside. We also describe how the trusted code in a remote machine can establish a secure channel with the trusted code inside the isolated region.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having a secure computation provider 120 and one or more components 122-a. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, and 122-4. The embodiments are not limited in this context.

The system 100 may comprise a secure computation provider 120 that is in control over a computing environment. The secure computation provider 120 may be generally arranged to provide computing services to a number of computing devices in operation locally or remotely. One example of the computing environment includes configurations of processing resources and storage resources in the form of virtual machines that run various applications. One physical computer may be abstracted into several virtual machines and, alternatively, two or more physical computing devices may allocate processing power and/or storage space towards a executing a processing job on a computing framework, for example, to perform a large set of parallel computations on a large dataset.

Various embodiments describes herein refer to an application programming interface (API) component 122-1 operative to generate a primitive programming service comprising a number of primitive functions. The primitive functions may represent a minimum number of primitives suitable to support different secure computation providers and facilitate interactions with each provider's functionality. The API component 122-1 may be further operative to provide access to this primitive programming service, for example, for trusted code components within an isolated memory region 122-2. Via the API component 122-1, trusted code running within the isolated memory region 122-2 may execute a key exchange protocol with a remote trusted component running on a remote machine.

One feature of the key exchange protocol is an attestation key 122-3, which may be private to the secure computation provider 120, for authenticating data communicated out of the isolated memory region 122-2. The attestation key 122-3 may correspond specifically to the secure computation provider 120; therefore, using this key to produce a digital signature for some data ensures that data's integrity when transmitted out of the computing environment controlled by the secure computation provider 120. The data can be verified using a public key that corresponds to the attestation key 122-3. Because the remote trusted component can confirm the authenticity of the data, the secure computation provider 120 can ensure that the data has not been compromised while being outside of the isolated memory region 122-2.

The combined aspects of the digital signature from the attestation key 122-3 and a secured encryption key from the API component 122-1 provides additional data confidentiality and integrity for data communicated between the isolated memory region 122-2 and any trusted component outside of that region. In an embodiment where that trusted component includes remotely stored code, because the secured encryption key is encrypted through a scheme known to that code, it is unlikely that the encryption key has been compromised. Thus, the remotely stored code can be assured that communications with the isolated memory region 122-2 are secure.

Untrusted code 122-4, according to one embodiment, is executed in a memory region outside of the isolated memory region 122-2 and communicates with that region through the API component 122-1. Once the key exchange protocol has been completed successfully, application code may run a set of computations on stored data, for example, in parallel with other trusted components. The application code running in the isolated memory region may use I/O control codes to instruct the untrusted code 122-4 to perform various computing tasks. Thus, the API component 122-1 provides secure communications between code running in the isolated memory region 122-2 and components running in memory regions outside of the isolated memory region 122-2. These components may include remotely stored code on a remote machine or the untrusted code 122-4.

The untrusted code 122-4 may create an isolated environment within storage memory and configure this isolated environment with computer code and/or data. To illustrate by way of example, the API component 122-1 implements the following function IsolatedRegionCreate( ) which when invoked, creates the isolated environment and loads a computer code package specified by a packagePath argument into that environment:

```
HANDLE
IsolatedRegionCreate(
    _In_    LPCTSTR           packagePath,
    _In_    ISOLATION_PROVIDER isolationProvider,
    _In_opt_ CALL_OUT_HANDLER callOutHandler
    )
```

In the above example, the isolationProvider identifies the underlying provider of secure computation services, e.g., VSM. The packagePath argument may refer to file data in a global or cloud file system instead of a local file system. The callOutHandler identifies a function in the untrusted code that can handle IO control codes sent from inside the region. The package is a container of code (e.g., trusted application code) and data. One example package is a mobile application package that is downloadable from a mobile application platform. The package also includes configuration parameters such as the size of the region.

The untrusted code 122-4 may invoke code in the isolated memory region 122-2. One way to achieve this is to send an Input/Output (IO) control code (e.g., an IOCTL code) to the isolated memory region 122-2:

```
IRIO_RESULT
IsolatedRegionIOControl(
    _In_    HANDLE region,
    _In_    DWORD callInId,
    _In_reads_bytes_opt_(inputBufferBytes) LPCVOID inputBuffer,
    _In_    SIZE_T inputBufferBytes,
    _Out_writes_bytes_to_opt_(outputBufferBytes,
    *bytesReturned) LPVOID outputBuffer,
    _In_    SIZE_T outputBufferBytes,
    _Out_opt_ PSIZE_T bytesReturned
    )
```

The region argument defines an address or location of the isolated memory region 122-2. The callInID argument identifies a function in the isolated memory region 122-2 that is configured to handle control codes (or other communication primitives) from the untrusted code 122-4. The callInID argument may be supplied by information accompanying the code package. The inputBuffer and outputBuffer arguments are memory buffers that store the control codes and returned results, respectively. Finally, the untrusted code 122-4 can destroy the isolated memory region, for example, by calling the following function:

VOID IsolatedRegionClose(_In_ HANDLE region)

As noted herein, the functions implemented by the API component 122-1 may be extended to perform additional tasks, such as memory management functions. As an example, VirtualAlloc ( ) and VirtualFree ( ) could be implement inside the isolated memory region 122-2 to dynamically allocate/free virtual memory.

Figure 2:
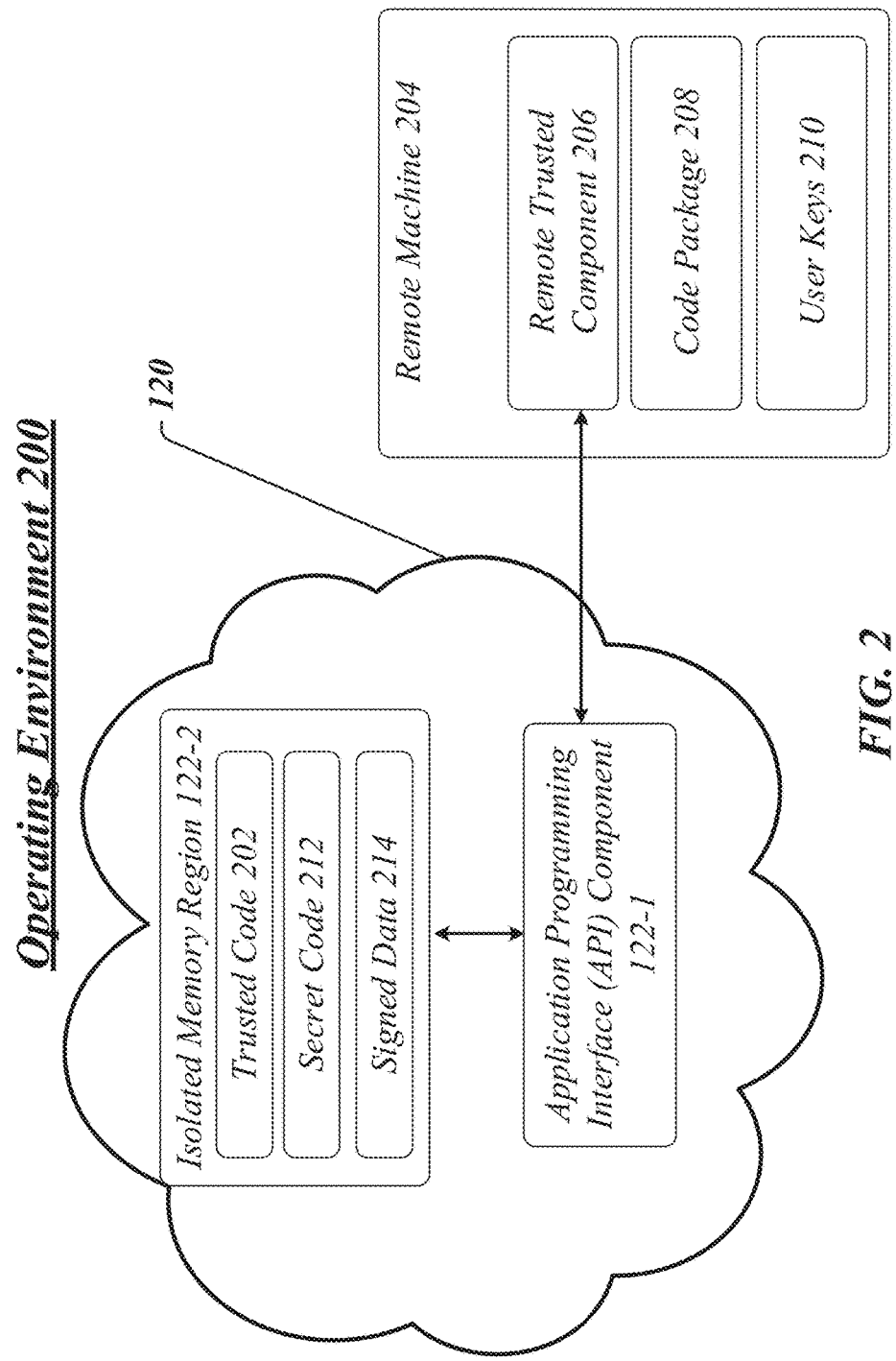
FIG. 2 illustrates an embodiment of an operating environment for a trusted component.

FIG. 2 illustrates an embodiment of an operational environment 200 for the system 100. As shown in FIG. 2, the API component 122-1 receives control directives, such as communication primitives, from the trusted code 202 running within an isolated memory region 202. Some control directives instruct the API component 122-1 to communicate the signed data 214 to a remote machine. A remote trusted component 206 running on the remote machine may execute a verification process on the signed data 122-3 to determine whether such data has been misappropriated and/or to protect the remote machine from malicious activity.

According to one example embodiment, the trusted code 202 and the remote trusted component 206 engage in a key exchange protocol through which one or more encryption keys are securely communicated through untrusted code. One example implementation of the trusted code 202 invokes a communication primitive via a function call to instruct the API component 122-1 to generate an encryption key. The trusted code 202 secures the encryption key, for example, by encrypting the encryption key with a public key of the remote trusted component 206. The trusted code 202 invokes another primitive function to request a signature for the secured encryption key, which is then stored in the signed data 214. It is appreciated that numerous alternative key exchange protocols may be implemented. As one alternative, for instance, the trusted code 202 may use another encryption scheme.

In one embodiment, the remote trusted component 206 encrypts code (e.g., a library of functions) and data and binds them into a code package 208. Encryption keys used to generate the encrypted code package 208 are referred to as user keys 210. A portion of the code package 208 may be public code and can be stored in the trusted code 202. Another portion may include supporting code files and also can be stored in the trusted code. Another portion may remain secure as secret code 212 in the isolated memory region 122-2 until a secure communication channel has been established. In some embodiments, the code package 208 includes metadata to identify function or functions that handle communication primitives (e.g., I/O codes) from code executed in a memory region other than the isolated memory region 122-2. Each function definition in the metadata enables instant communication and control over application functionality for untrusted code.

In one embodiment, the remote trusted component 206 uses the encryption key to secure the user keys 210, which are encryption keys that initially encrypted the secret code 212 prior to that secret code 212 being transferring to the isolated memory region 122-2. As described herein with respect to FIG. 1, the secret code 212 may constitute as part of a computer code package 208 that can be installed in the isolated memory region 122-2 to perform secure computation on data stored in external storage. According to one embodiment, the secret code 212 includes parallel processing jobs (e.g., Map and Reduce functions) to be performed on a substantial data set for a considerable number of client computing devices.

The trusted component 202 receives the user keys 210 and decrypts the secret code 212 to access parallel processing job information that defines a set of computations to be performed on stored data. The secret code 212 distributes the parallel processing jobs amongst one or more resources within the isolated memory region 122-2 to generate computation data, which is secured using the encryption key generated during the key exchange protocol. The trusted component 202 requests a signature for the secured computation data and both the signature and the secured computation data are communicated as signed data 214 to the remote trusted component 206. Using one or more communication primitives (e.g., I/O control codes), the trusted code 202 generate a message to store the signed data 214 and writes the message to a memory buffer for communication to the API component 122-1. It is appreciated that the message contents can be used to establish shared secret data between the trusted code 202 and the remote trusted component 206 in a variety of ways (e.g., Diffie-Hellman key exchange). The embodiments described herein support several of these secure channel establishment mechanisms and provide a mechanism to select a particular mechanism.

The remote trusted component 206, in turn, uses the API component 122-1 to verify the message contents' integrity and confidentiality. One example implementation determines whether the signature is produced from a private attestation key corresponding to the secure computation provider 120 of the computing environment (e.g., instead of a malicious provider) and whether the message content was generated by the trusted code 202. Another example implementation determines whether the secured computation data is produced from the secret code 212 (e.g., instead of a compromised code package). Using one or more communication primitives (e.g., I/O control codes), the trusted component 202 writes the signed data 214 to and/or reads data to a memory buffer that is communicated to the API component 122-1.

The signed data 214 may include a signature or another authentication code generated from the secure computation provider's attestation key. In some embodiments, this key may be a private key under a public key cryptography scheme and correspond specifically to the associated secure computation provider. In some embodiments, the signed data further includes an encryption key that is unknown to untrusted code components in operation at the secure computation provider. Because the encryption key is secured from the untrusted components, the key may be communicated to code running outsider of an isolated memory region without being compromised. If that code is running on a remote machine, the code can verify the key by examining the signature to determine whether the key was compromised while outside of the isolated memory region. The signed data 214, hence, verifies the key's integrity and confidentiality to the remote machine's system.

Figure 3:
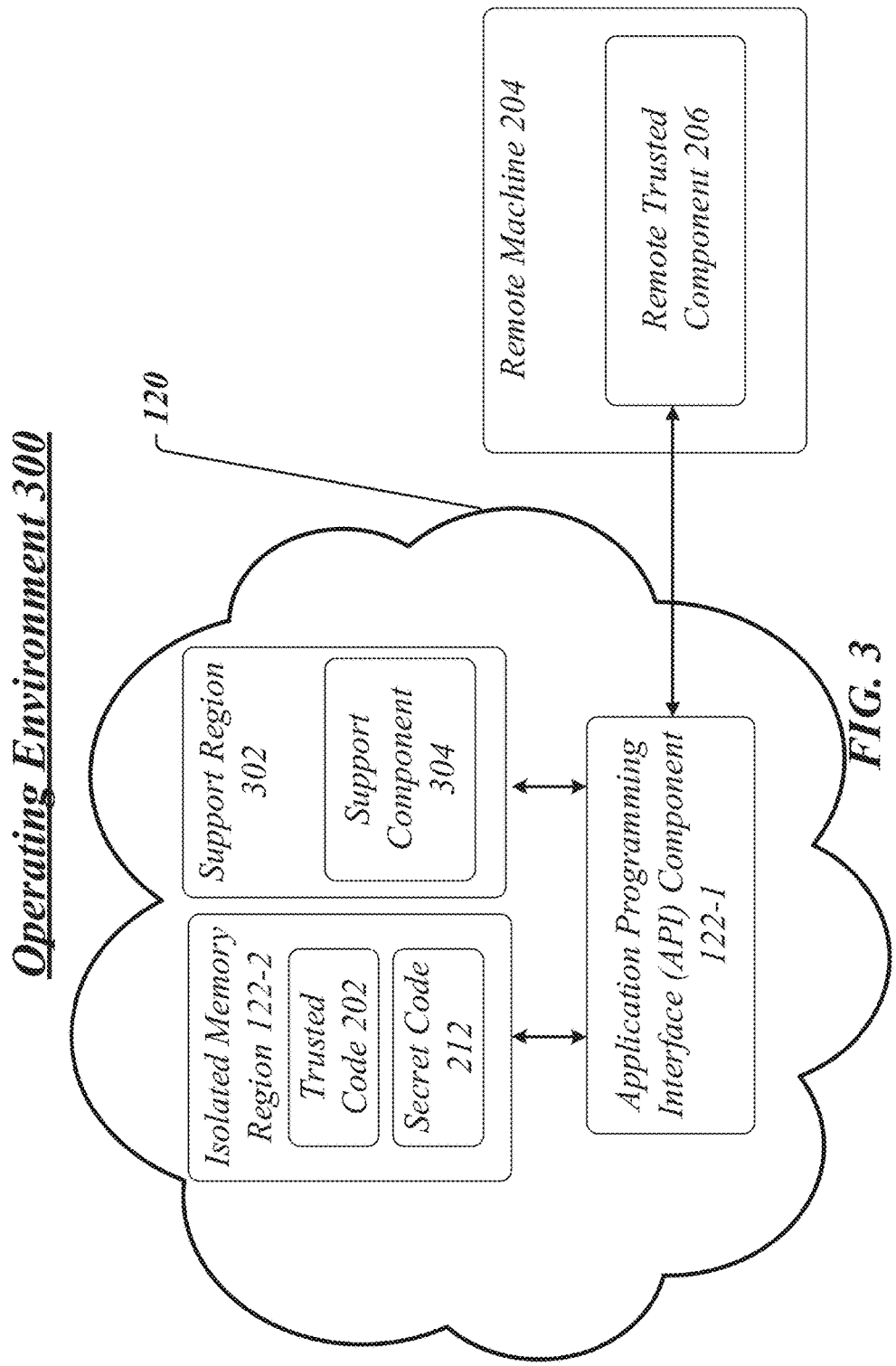
FIG. 3 illustrates an embodiment of an operating environment for a trusted component with a support region.

FIG. 3 illustrates an embodiment of an operating environment 300 for an isolated memory region 122-2 with a support region for a support component 304. In this embodiment, the trusted code 202 operates with the support component 304 to achieve secure computation for data stored in external storage.

To illustrate by way of example, the secure computation provider 120 may operate a cloud computing environment where each machine creates a support region 302 in memory that is isolated from untrusted code running elsewhere on the machine. Using the API component 122-1, for instance, the untrusted code may create the support region 302 with IsolatedRegionCreate ( ) and loads that region with the support component 304. The support component 304 implements one or more management functions that allow the remote trusted component 206 to send private computer code securely to the cloud computing environment for storage in the isolated memory region 122-2. The code for implementing the support component 304 is trivial and can be made public.

The untrusted code invokes functions in the support component 304 through IsolatedRegionIOControl ( ) function calls, as described herein. The support component 304 generates a public-private encryption key pair in accordance with an encryption scheme that not known to another code component. This public-private encryption key pair may be specific to processing resources that have been allocated to isolated memory region 122-2. The support component 304 invokes a primitive function on the API component 122-1 to generate a sealing key for encrypting the private key. The support component 304 invokes another primitive function to generate a signature for the public key. Using the signature and the secured private encryption key, the support component 304 engages in a key exchange protocol with the remote machine.

To illustrate by way of an example, consider that the isolated memory region 122-2 is depicted in FIG. 3 as having the secret code 212, which is secured computer code for performing a set of computations on stored data. Functions within the secret code 212 may be encrypted with a secret key known to the remote trusted component 206. After the API component 122-1 verifies the attestation of the public key mentioned above, the remote trusted component 206 encrypts the secret key for the secret code 212 with the public key. Hence, this secret key may be known as a user key, similar to the user keys 208 of FIG. 2.

To secure communications between the support region 302 and the isolated memory region 122-2 (the support component 304 in this instance constituting as code running outside of the isolated memory region 122-2), the support component 304 and the trusted code 202 initiate a key exchange protocol such that the trusted code 202 receives the secret key for decrypting the secret code 212 and the support component 304 receives a private key for securing the secret key and possibly other communications in the future. Once decrypted, functions of the secret code 212 are incorporated into the trusted code 202 and the private key may be used by those functions to secure data (e.g., encryption value-pairs) written to or read from the untrusted code.

Figure 4:
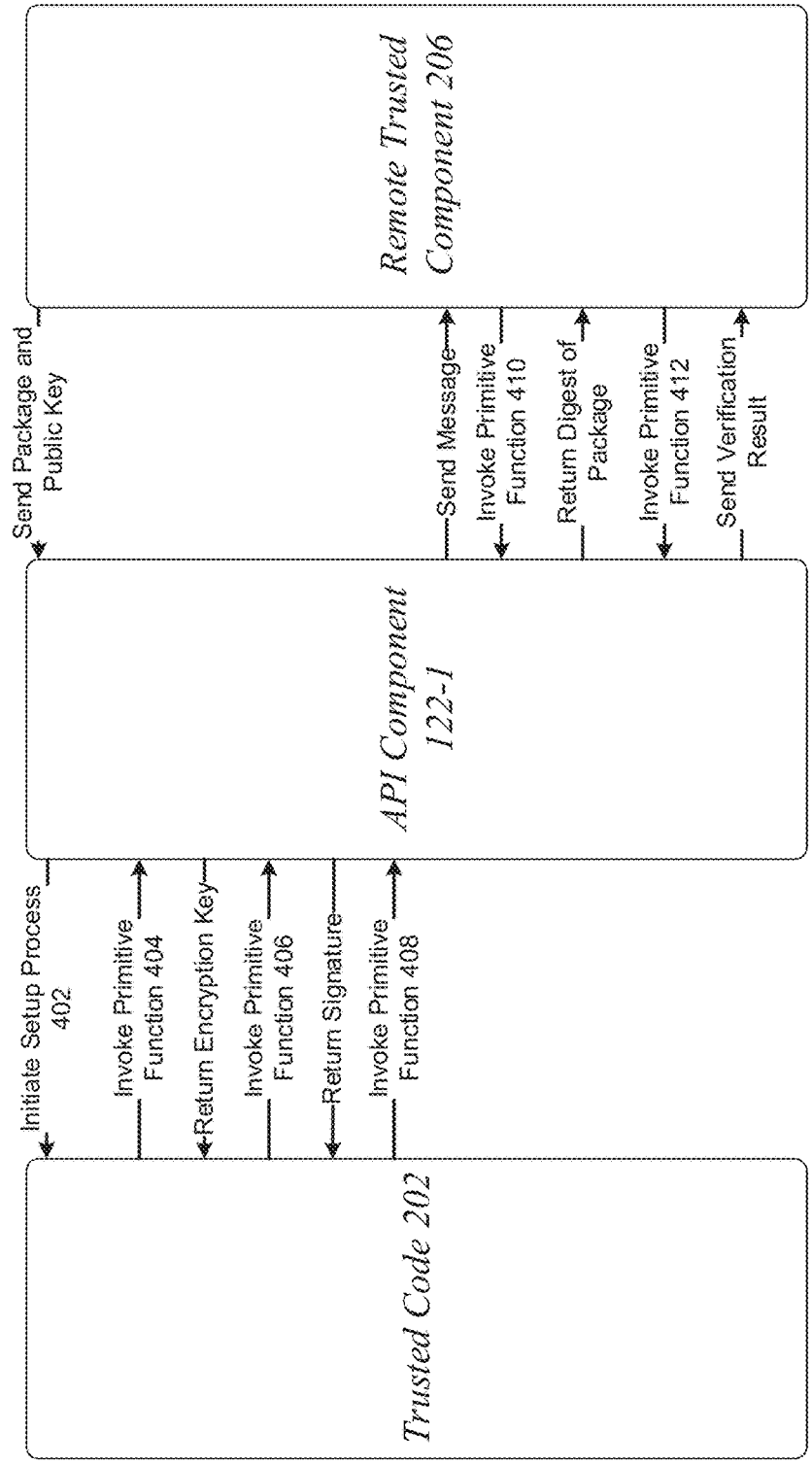
FIG. 4 illustrates an embodiment of a key exchange protocol between a trusted component and a remote trusted component.

FIG. 4 illustrates an embodiment of a key exchange protocol 400 between the trusted component 202 and the remote trusted component 206.

As described herein, untrusted code running in the computing environment 120 invokes a function on the API component 122-1 to create an isolated memory region and load computer code into that region. Executing that computer code generates the trusted component 202 and initiates the key exchange protocol 400. One example implementation of the API component 122-1 loads the package into the isolated memory region and sends the trusted component 202 a public key for the remote trusted component. The API component 122-1 may store the public key in a memory buffer of a message that is communicated to the trusted component 202 to initiate setup process 402. The public key may be specific to a particular remote machine. The message also includes configuration parameters such as the size of the region.

To commence the setup process 402, the trusted component 202 may invoke a primitive function call 404 and in response, the API component 122-1 generates and returns an encryption key to secure communications between the trusted component 202 and the remote trusted component 206. These keys allow the trusted code to encrypt data, save it in external storage, and then decrypt it in a subsequent execution.

In the below example implementation of the primitive function 404, a function call to IsolatedAppGetKey requests a key corresponding to KeyID with parameters keyBufferBytesRequired and keyBufferBytes in buffer keyBuffer:

```
BOOL
IsolatedAppGetKey(
    _In_ KeyId keyId,
    _Out_writes_bytes_to_(keyBufferBytes,
*keyBufferBytesRequired) LPVOID keyBuffer,
    _In_ SIZE_T keyBufferBytes,
    _Always_(_Out_) PSIZE_T keyBufferBytesRequired )
```

In another operation, the trusted component 202 may secure the encryption key with the public key and invoke a primitive function 406 and in response, the API component 122 generates and returns a digital signature of the secured encryption key. In yet another operation, the trusted component 202 may invoke a primitive function 408 to write the digital signature and the secured encryption key into a memory buffer and communicate a message to the API component 122-1. In response, the API component 122-1 sends the message to the remote trusted component 206.

In the below example implementation of the primitive function 404, a function call to IsolatedAppSignMessage instructs the API component to generate the digital signature for the message contents and store the digital signature in the outputBuffer.

```
BOOL
IsolatedAppSignMessage(
    _In_reads_bytes_(messageBytes) LPCVOID message,
    _In_ SIZE_T messageBytes,
    Out_writes_bytes_to_(outputBufferBytes,
*outputBufferBytesRequired) LPVOID outputBuffer,
    _In_ SIZE_T outputBufferBytes,
    _Always_(_Out_) PSIZE_T
outputBufferBytesRequired
    )
```

The remote trusted component 206 may read data from the memory buffer and extract the digital signature and the secured encryption key. In one operation, the remote trusted component invokes a primitive function 410 to generate a cryptographic digest of a true copy of the package. In another operation, the remote trusted component 206 invokes a primitive function 412 to determine whether the digital signature was generated by the package with the cryptographic digest. The API component 122-1 may send a verification result indicating either that the data in the memory buffer is secure or that the data has been misappropriated or, at least, incorrect.

In the below example implementation of the primitive function 404, a function call to IsolatedAppIoControl communicates an IO control code in inputBuffer and the API component 122-1 performs the IO control code and returns a result in outputBuffer:

```
IRIO_RESULT
IsolatedAppIoControl(
    _In_    DWORD callOutId,
    _In_reads_bytes_opt_(inputBufferBytes) LPCVOID
inputBuffer,
    _In_    SIZE_T inputBufferBytes,
    _Out_writes_bytes_to_opt_(outputBufferBytes,
*bytesReturned) LPVOID outputBuffer,
    _In_    SIZE_T outputBufferBytes,
    _Out_opt_ PSIZE_T bytesReturned )
```

The trusted code 202 invokes the above primitive function to instruct the API component 122-1 to communicate the message in the memory buffer inputBuffer to the remote trusted component.

One example mechanism to establish a secure communication channel operates these functions to verify that the message originated from trusted code 202 in the isolated memory region:

```
BOOL
IsolatedRegionGetDigest(
    _In_ LPCTSTR packagePath,
    _Out_writes_bytes_to_(regionDigestBytes,
*regionDigestBytesRequired)
        LPVOID regionDigest,
    _In_ SIZE_T regionDigestBytes,
    _Out_ PSIZE_T regionDigestBytesRequired
)
BOOL
IsolatedRegionCheckSignature(
    _In_    ISOLATION_PROVIDER isolationProvider,
    _In_reads_(regionDigestBytes) LPCVOID
regionDigest,
    _In_ SIZE_T regionDigestBytes,
    _In_reads_(messageBytes) LPCVOID message,
    _In_ SIZE_T messageBytes,
    _In_reads_(signatureBytes) LPCVOID signature,
    _In_ SIZE_T signatureBytes
)
```

The IsolatedRegionGetDigest( ) function returns a cryptographic digest that deterministically identifies a code package located at an address denoted in packagePath in a local file system or global or cloud-based file system. This code package may denote a clean or uncorrupted version of an application. The cryptographic digest can be passed as the regionDigest argument to the primitive function IsolatedRegionCheckSignature( ) along with an identifier for the secure computation provider 120. This function returns Boolean value "true" if the message in the buffer was produced by code on an isolated region that is created by the secure computation provider. For example, this function may authenticate the signature using a public attestation key corresponding to the secure computation provider 120 to confirm that the message contents were not compromised. As another example, this function may verify that code running inside the isolated memory region has not been compromised by comparing the above cryptographic digest to a digest produced for such code and a match indicates an unaltered copy of the code package. However, a mismatch indicates that the code inside the isolated memory region is not the same as the clean version. Hence, the contents of the signed/attested message can be used to share secret data between the trusted code 202 and the remote trusted component 206 in a variety of ways (e.g., Diffie-Hellman key exchange). The embodiments described herein support several of these secure channel establishment mechanisms and let users choose which one to use.

The following description applies to one or more example embodiments that implement a support component, such as the support component 304 of FIG. 3, in addition to the isolated memory region 122-2. The support component invokes primitive function IsolatedAppGetKey( ) on the API component 122-1 to generate an encryption key for use as a sealing key to encrypt the processor private key. The support component may invoke primitive function IsolatedAppSignMessage ( ) to sign the processor public key and then, publish the key.

As users develop application code (e.g., map and reduce functions), the remote trusted component compiles and encrypts the application code with a secret key and binds the encrypted application code with public code to produce a code package (e.g., a code library such as a Dynamic Link Library (DLL) file). The remote trusted component 206 may verify the attestation of the processor public key using function IsolatedRegionCheckSignature ( ) and then, encrypt the secret key that was used to encrypt the application code with the processor public key.

The untrusted code in the cloud computing environment loads the code package into an isolated memory region with function IsolatedRegionCreate ( ), and uses function IsolatedRegionIOControl ( ) to instruct the public code to generate a new random symmetric key to establish a secure communication channel with the isolated memory region. The new key for the region is encrypted with the processor public key and the user region gets a signature by invoking function IsolatedAppSignMessage ( ). The encrypted new key is then sent to the support region. The support region verifies the signature with IsolatedRegionCheckSignature ( ), and decrypts the encrypted new key. The support region then decrypts the secret key for the application code (which was encrypted with the processor public key), encrypts that secret key with the new key from the isolated memory region and sends the encrypted secret key to the isolated memory region. Trusted code running within that region decrypts the secret key and decrypts the application code and then, invokes functions in the application code by calling function IsolatedRegionIOControl ( ) to communicate a primitive IO control code (or another control directive) to a handler for processing IO control codes directed towards the application code. The trusted code prepares secure computation data for external storage by directing IO control codes to a particular handler in the untrusted code. For example, the trusted code invokes function IsolatedAppIOControl ( ) to direct a IO control code to the untrusted code's handler to instruct that handler to read encrypted key-value pairs; and after performing computations on those pairs, the trusted code invokes function IsolatedAppIOControl ( ) to direct a IO control code to the untrusted code's handler to instruct that handler to write the encrypted key-value pairs.

Figure 5:
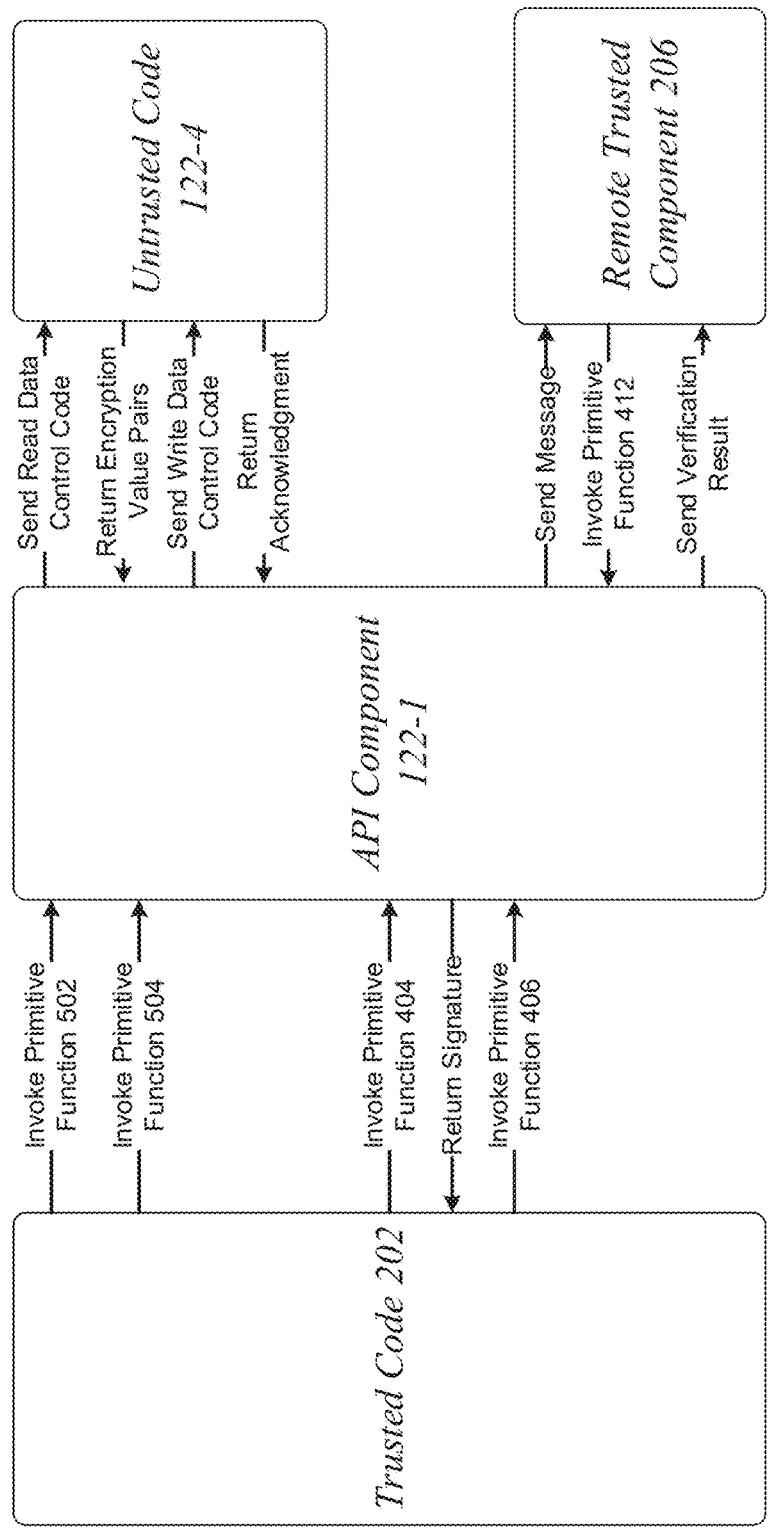
FIG. 5 illustrates an embodiment of a secure communication channel between a trusted component and a remote trusted component.

FIG. 5 illustrates an embodiment of a secure communication channel 500 between the trusted code 202 and the remote trusted component 206. When application code running in the isolated memory region is executing a set of computations for a parallel processing job, the trusted code 202 invokes a primitive function 502 to read data (e.g., an encryption value-pair) from untrusted code 122-4. The untrusted code 122-4 to return encryption value-pairs. The trusted code 202 may invoke this function and perform one or more computations on the encryption-value pairs. In another operation, the trusted code 202 invokes a primitive function to write encryption-value pairs to external storage and the untrusted code 122-4 returns an acknowledgment when completed.

To send these pairs to remote trusted component, the trusted code 202 invokes the primitive function 404 to process a digital signature for authenticating the encryption-value pairs. To send a message with the digital signature and the encryption-value pairs, the trusted code 202 invokes the primitive function 406 to communicate the message to the remote trusted component. Prior to decrypting the secure computation data, the remote trusted component invokes the primitive function 412 to verify the digital signature.

Figure 6:
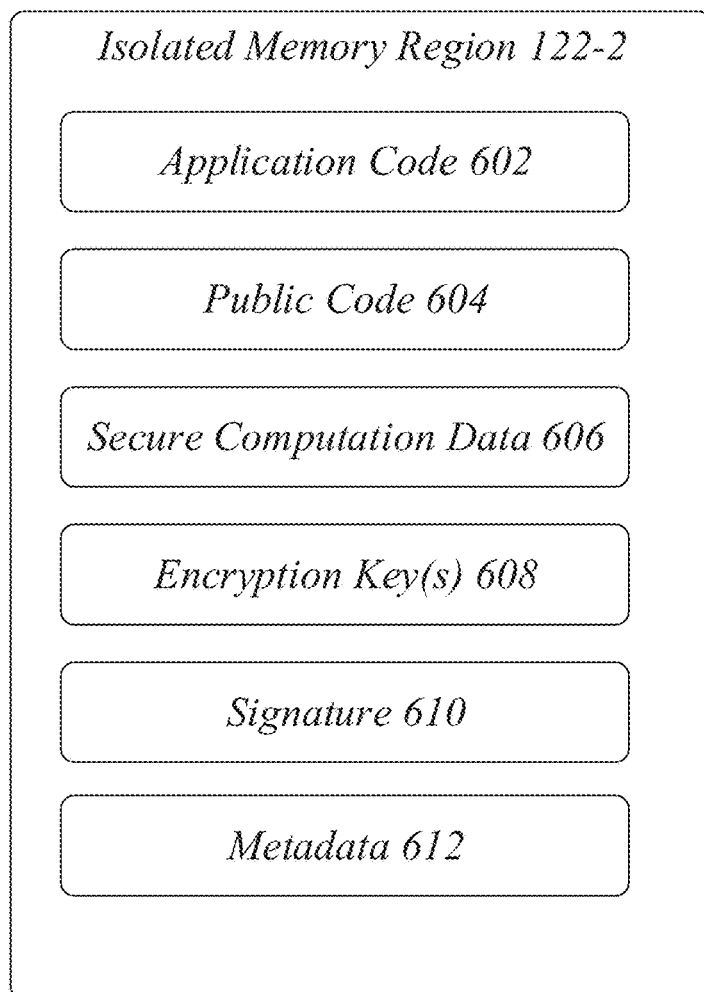
FIG. 6 illustrates an embodiment of an isolated environment for trusted code in an isolated memory region.

FIG. 6 illustrates an embodiment of an isolated environment 600 for trusted code and data in the isolated memory region 122-2. Application code 602 may be secret code in encrypted form. Public code 604 includes an interface for the application code 602 to use for executing a set of computations on stored data to produce computation data 606. The application code 602 may use the public code 604 to secure the computation data 606 with an encryption key 608 and communicate the secured computation data 606 to untrusted code outside of the isolated memory region 122-2. The public code 604 may also communicate a signature 610 to code executed in a memory region different from the isolated memory 122-2 by requesting the signature 610 from an API component and communicating that signature 610 in a memory buffer of a message. As described herein, the code executed in the different memory region may refer to untrusted code running in a cloud computing environment or remotely stored coded executed by a remote machine.

In some embodiments, the public code 604 may leverage metadata 612 to identify a memory region of the application code 602 comprising one or more functions that are configured to handle control directives (e.g., communication primitives, such as I/O control codes) from untrusted code running outside of the isolated memory region 122-2. Via an application programming interface (API) component such as those described herein, the untrusted code may invoke primitive functions to communicate the control directives to call some of these functions. Hence, the metadata 612 enables access to the complex functionality implemented by the application code 602 through (e.g., lower-level) inter-process communication primitives.

Figure 7:
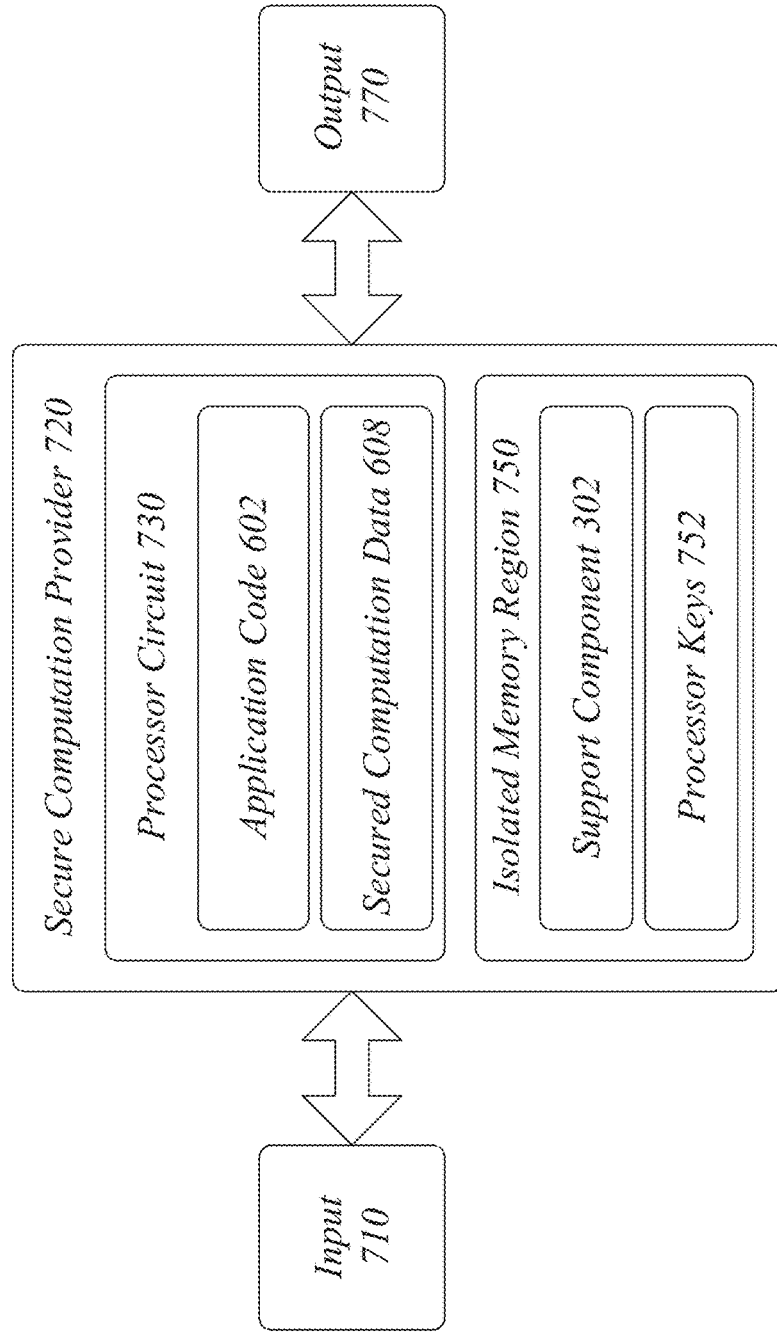
FIG. 7 illustrates an embodiment of a system for a secure computation provider.

FIG. 7 illustrates an embodiment of a computing environment 700 for a secure computation provider 720. The secure computation provider 720 depicts an alternative to the secure computation provider 120 of FIG. 1. In this embodiment, the support component 304 of FIG. 3 has access to application code running in a processing unit. It is appreciated that the computing environment 700 represents one alternative to the system 100 of FIG. 1 and other alternatives and modifications are envisioned in this disclosure.

The secure computation provider 720 in control of the computing environment 700 includes a processor circuit 730 and an isolated memory region 750, which further comprises the support component 304 and processor keys 752. The isolated memory region 750 may be configured similar to the isolated memory region 122-2 of FIG. 1. The application code 602 is executing a set of computations on data using the processor circuit 730. As described herein, the support component 302 generates one or more processor keys 752 to secure computations at a processing unit-level. Hence, the secured computation data 608 may be decrypted/encrypted quickly, enhancing computation throughput with little or no security risk.

Figure 8:
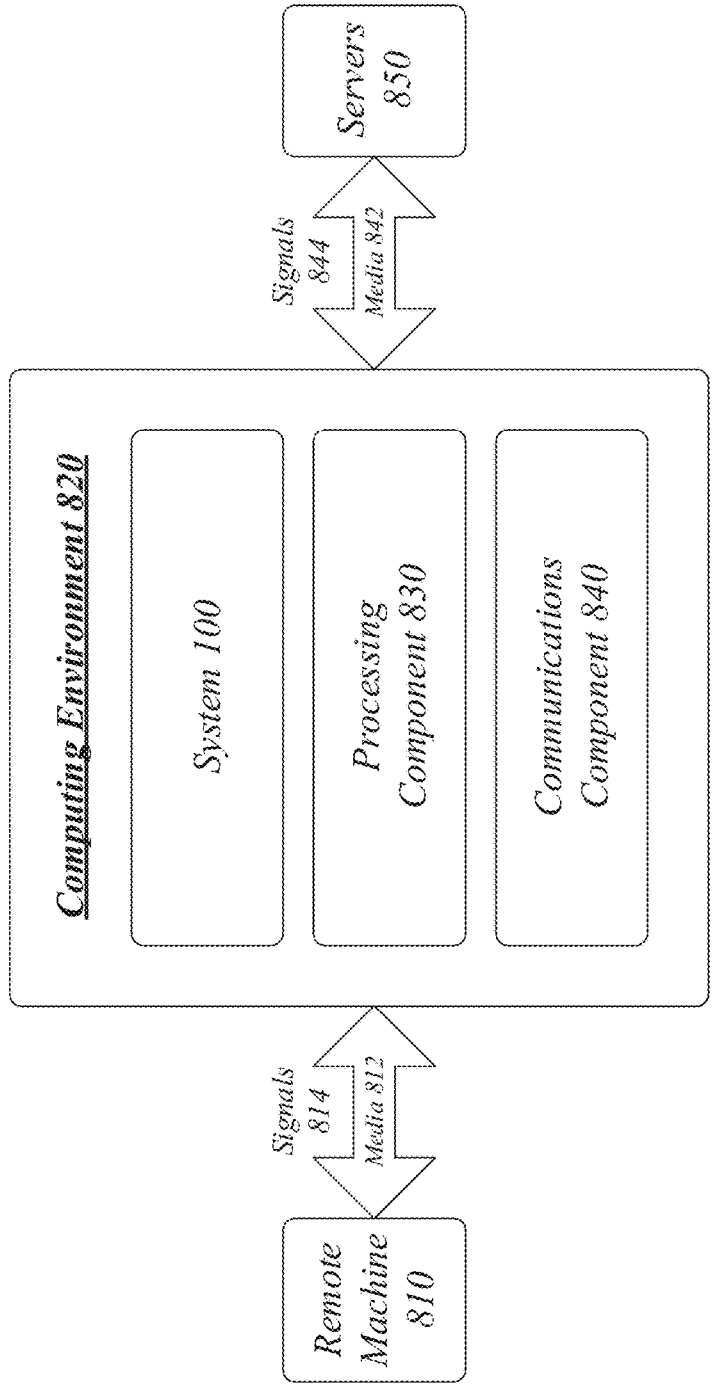
FIG. 8 illustrates an embodiment of a centralized system for the system of FIG. 1.

FIG. 8 illustrates a block diagram of a centralized system 800. The centralized system 800 may implement some or all of the structure and/or operations for the system 100 in a single computing entity, such as entirely within a single device 820.

The device 820 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 810, 850 over a communications media 812, 842, respectively, using communications signals 814, 844, respectively, via the communications component 840. The devices 810, 850 may be internal or external to the device 820 as desired for a given implementation.

As described herein, a trusted component running on a remote machine desires a secure communication channel with application code running in an isolated memory region of the computing environment of FIG. 8. An API component of a secure computation provider may establish secure communication channels with the isolated memory region via the primitive programming model. Using function calls that invoke communication primitives, the untrusted code and the trusted code establish a secure connection or communication channel by implementing an encryption protocol for securing network data traffic, such as a Transport Layer Security (TLS), Secure Sockets Layer (SSL) and/or the like.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 9 illustrates an embodiment of a logic flow 900 for the system of FIG. 1. The logic flow 900 may be representative of some or all of the operations executed by one or more embodiments described herein. In the illustrated embodiment shown in FIG. 9, the logic flow 900 may be executed by the API component 122-1 of FIG. 1 to establish a secure communication channel between trusted code and code running outside of an isolated memory region at block 906.

For example, the logic flow 900 may generate the isolated memory region in a computing environment and a store a code package in that region at block 902 when untrusted code in the computing environment invokes a primitive function to configure the isolated memory region according to certain parameters (e.g., size). The logic flow 900 may generate a signature using a private attestation key that corresponds specifically the secure computation provider 120 that is in control over the computing environment.

The logic flow 900 may execute a verification process at block 906 during which the code package is authenticated to a remote trusted component running in a remote machine. The logic flow 900 may execute the verification process to complete a key exchange protocol such that the trusted code provides the remote trusted component with an encryption key secured with a public key and a signature to authenticate the encryption key. For example, the public key may correspond to credentials corresponding to the remote machine that has requested computing services. In response, the remote trusted component returns data on how to access the code package, for example, by securing a user key using the encryption key and communicated the secured user key to the trusted code via a function call to the API component. The function call may result in the communication of a control code to the trusted code, which prompts that code to read the secured user key, decrypt the user key and then, decrypt secret code in the code package to access the code package's functionality.

For instance, the API component and the untrusted code may instruct trusted code in the isolated memory region to initiate a setup process for the key exchange protocol. The API component may generate and communicate the encryption key to the isolated memory region. After the trusted code secures the encryption key, the trusted code requests the API component to generate a signature using a private key corresponding to a secure computation provider in control over the computing environment. The API component communicates a message comprising the signature to a remote trusted component running on a remote machine. After the key exchange protocol, the API component executes the verification process on the message to extract the message's contents and determine how to access the code package. If successful, the verification process proves that the signed/attested message originated from trusted code in the isolated memory region. The API component may communicate the secured user keys to the trusted code running in the isolated memory region. The API component may generate a cryptographic digest for a clean code package and perform a comparison between that digest to the cryptographic digest of the code package that originated the message.

The logic flow 900 may proceed to communicate a verification result, at block 908, to the remote trusted component running on the remote machine. The logic flow at block 908 completes the establishment of the secure communication channel to the isolated memory region and code running in that region. For at least this reason, the logic flow 900 may proceed to performing to higher-level computations. These computations involve more complex control directives than inter-process communication primitives (e.g., IO control codes). To illustrates, as one option, the logic flow may proceed to block 908 and store secured data (e.g., encryption value-pairs) in a cloud file system where external storage appears as one file system. As another option, the logic flow 900 may communicate IO control codes to the untrusted code and invoke a function (e.g., a hardware driver function). The embodiments are not limited to this example.

Figure 10:
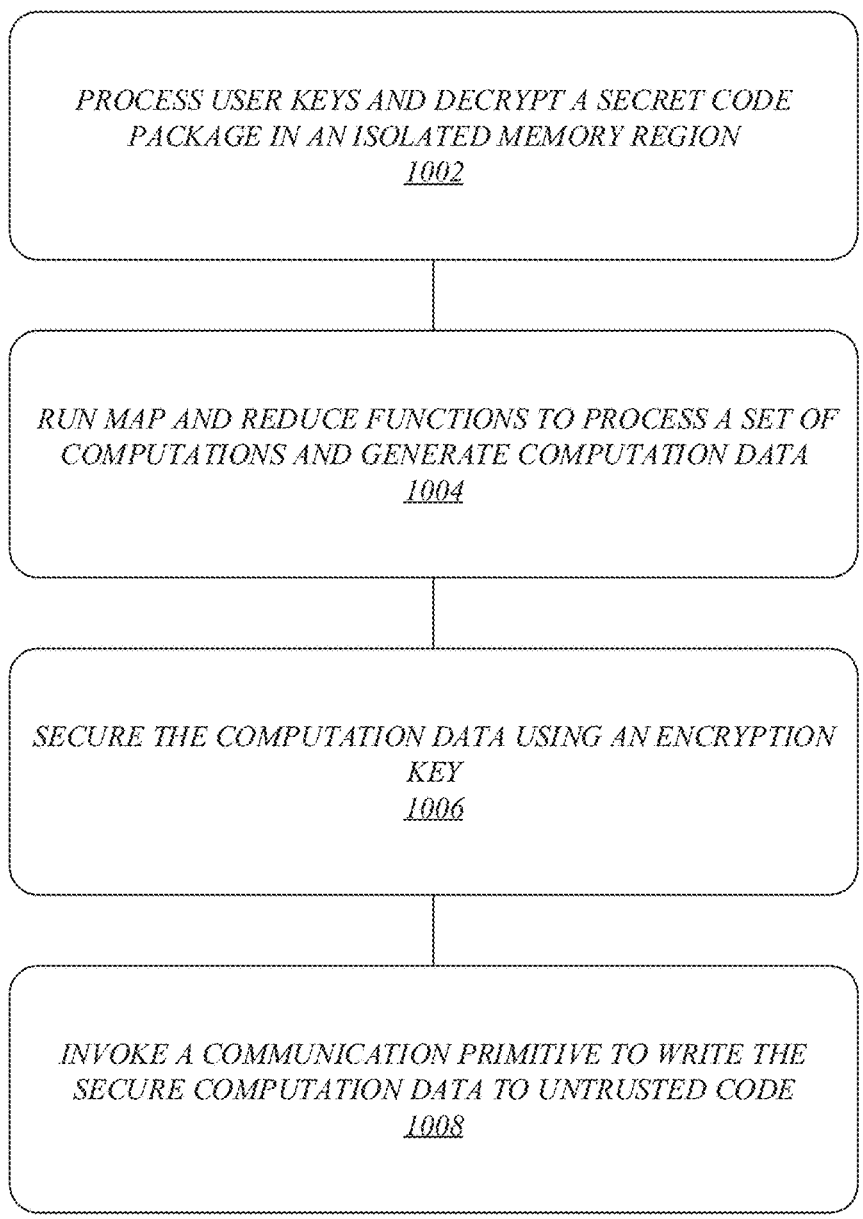
FIG. 10 illustrates an embodiment of a logic flow for the trusted component of FIG. 5.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 may process user keys and decrypt a secret code package stored in an isolated memory region at block 1002. Map and reduce functions in the decrypted code package, i.e., now trusted code, may define a set of computations. The logic flow 1000 may run the map and reduce functions to execute the set of computations on stored data and generate computation data at block 1004. The logic flow 1000 may secure the computation data using an encryption key that is unknown to untrusted code running outside of the isolated memory region. The logic flow 1000 may invoke a primitive function to generate a signature for the secure computation data at block 1006. The logic flow 1000 invokes, at block 1008, a communication primitive operative to write the secure computation data to the untrusted code. For example, the logic flow 1000 may instruct the untrusted code to store the secure computation data in external storage. The embodiments are not limited to this example.

FIG. 11 illustrates an embodiment of a logic flow for the remote trusted component of FIG. 4. The logic flow 1100 may be representative of some or all of the operations executed by one or more embodiments described herein.

In the illustrated embodiment shown in FIG. 11, the logic flow 1100 commences at block 1102 where the logic flow 1100 encrypts a code package and communicates the encrypted code package to a computing environment along with a public key. The logic flow 1100 may process a signed/attested message at block 1104 and extract signed data from a memory buffer in that message. The logic flow 1100 initiates a process at block 1106 to verify that the signed data originated from the secret code package and thus, has not been tampered or compromised. If verified, the contents of the signed/attested message can be used to share secret data between the trusted code in an isolated environment and the remote trusted component in a remote machine in a variety of ways (e.g., Diffie-Hellman key exchange). The embodiments described herein support several of these secure channel establishment mechanisms and let users choose which one to use.

The logic flow 1200 may perform a determination as to whether the signed data has been compromised at block 1106 and either reject a connection with the isolated environment at block 1108 or accept the connection at block 1110. Numerous example embodiments for a verification process are described herein and any of these examples can be used to render such a determination. If, for instance, the signed data cannot be verified with a public attestation key for the secure computation provider, it would appear that the message contents have be tainted. As another example, if the secret code package's cryptographic digest does not match the digest of the version stored at the remote machine, the code package may have been altered indicating the isolated environment have be compromised. If the logic flow 1100 determines that the signed data is secure, the logic flow 1000 may decrypt an encryption key stored in the message and secure user keys for communication to the trusted code at block 1110. As described herein, the user keys include encryption keys for decrypting the secret code package. The embodiments are not limited to this example.

Figure 12:
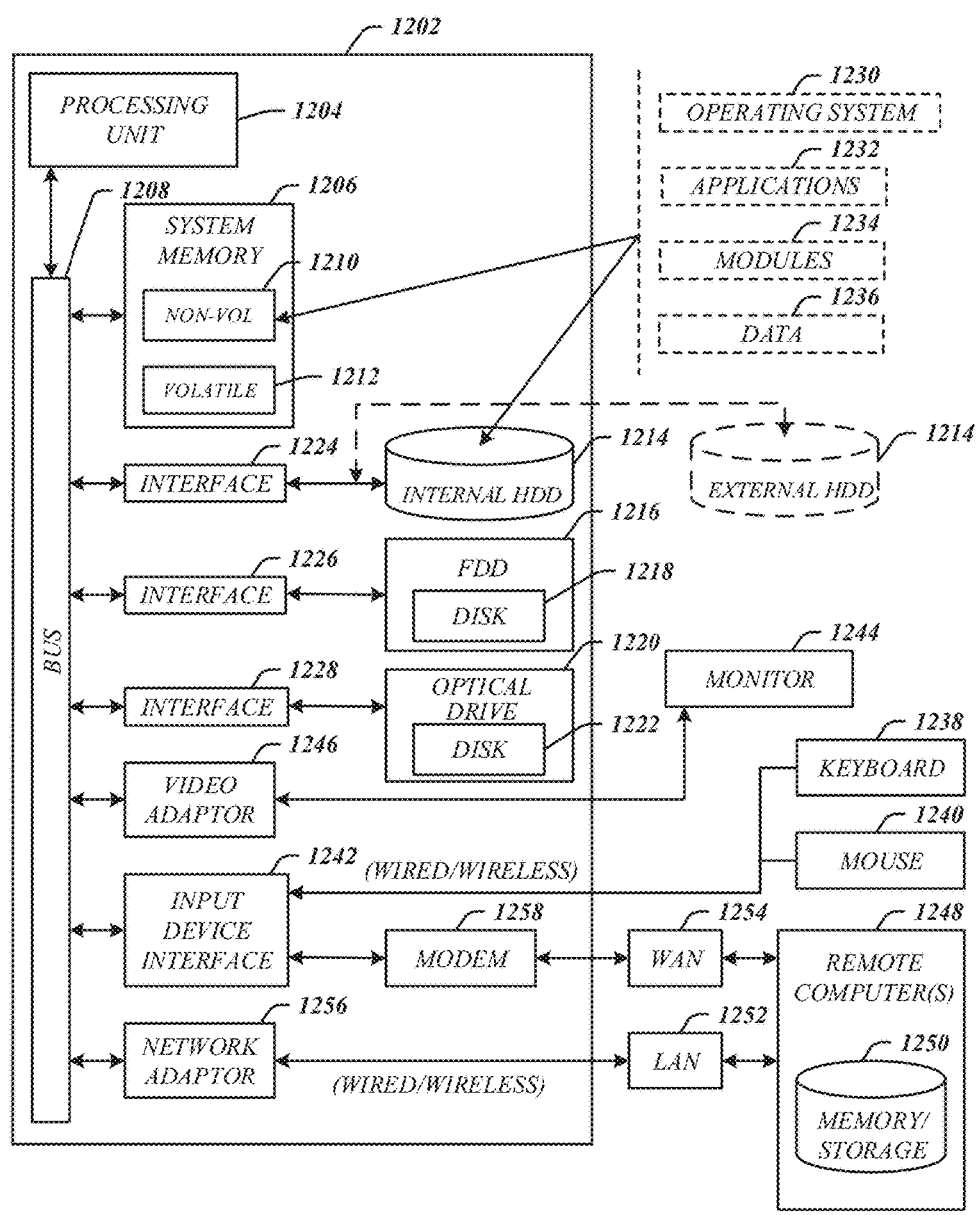
FIG. 12 illustrates an embodiment of a computing architecture.

FIG. 12 illustrates an embodiment of an exemplary computing architecture 1200 suitable for implementing various embodiments as previously described. In one embodiment, the computing architecture 1200 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1204.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236. In one embodiment, the one or more application programs 1232, other program modules 1234, and program data 1236 can include, for example, the various applications and/or components of the system 100.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
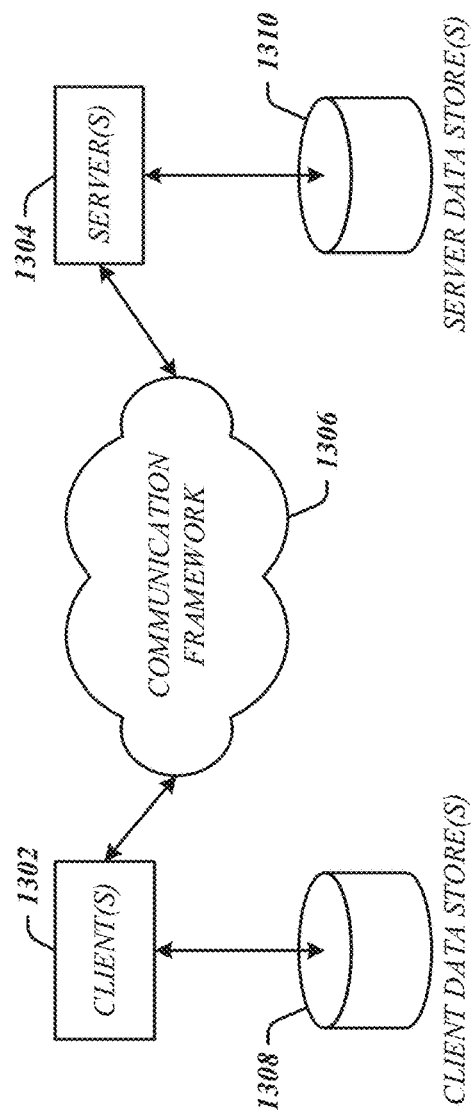
FIG. 13 illustrates an embodiment of a communications architecture.

FIG. 13 illustrates a block diagram of an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 13, the communications architecture 1300 comprises includes one or more clients 1302 and servers 1304. The clients 1302 may implement the client device 910. The servers 1304 may implement the server device 950. The clients 1302 and the servers 1304 are operatively connected to one or more respective client data stores 1308 and server data stores 1310 that can be employed to store information local to the respective clients 1302 and servers 1304, such as cookies and/or associated contextual information.

The clients 1302 and the servers 1304 may communicate information between each other using a communication framework 1306. The communications framework 1306 may implement any well-known communications techniques and protocols. The communications framework 1306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1302 and the servers 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments of the present disclosure include an apparatus comprising a logic circuit and logic operative on the logic circuit to configure an isolated memory region in a computing environment for secure communications with code executable in a memory region that is different from the isolated memory region, generate signed data using an attestation key that corresponds to the computing environment—the signed data comprising a secured encryption key and a signature to authenticate the secured encryption key—and communicate the signed data to a remote trusted component to access secret code stored in the isolated memory region.

The apparatus of the preceding paragraph may include logic further operative to generate the signature with a private attestation key that specifically corresponds to a secure computation provider that is in control of the computing environment. The apparatus of the preceding paragraph may include logic further operative to generate an encryption key for trusted code running in the isolated memory region. The apparatus of the preceding paragraph may include logic further operative to store key-value pairs in a buffer that is communicated to trusted code running in the isolated memory region or the remote trusted component. The apparatus of the preceding paragraph may include logic further configured to generate a cryptographic digest of a code package on a distributed file system and use the cryptographic digest to verify the signature of the secured encryption key. The apparatus of the preceding paragraph may include logic further operative to process a communication primitive directed towards trusted code running inside the isolated memory region or untrusted code running outside of the isolated memory region. The apparatus of the preceding paragraph may include logic further operative to process a communication primitive operative to invoke a function on the untrusted code running outside of the isolated memory region or the trusted code running inside the isolated memory region. The apparatus of the preceding paragraph may include logic further operative to verify the signature using a public attestation key and decrypt the secured encryption key to extract the encryption key. The embodiments described in the previous paragraph may also be combined with one or more of the specifically disclosed alternatives in this paragraph.

Various embodiments of the present disclosure also include an article comprising at least one computer-readable storage medium comprising instructions that, when executed, cause a system to generate computation data corresponding by executing a set of computations within an isolated memory region of a computing environment, secure the computation data using an encryption key to generate secured computation data, and invoke a primitive to communicate the secured computation data to code running outside of the isolated memory region.

The article of the preceding paragraph may further comprise instructions that, when executed, cause the system to process a signature of the secured data generated using a private key that is associated with the computing environment and invoke a primitive to communicate the secured computation data and the signature to a remote trusted component. The article of the preceding paragraph may further comprise instructions that, when executed, cause a system to invoke a primitive function to generate the encryption key and another primitive function to generate the signature using the encryption key. The article of the preceding paragraph may further comprise instructions that, when executed, cause a system to secure the encryption key with a public key that corresponds to a remote trusted component running on a remote machine. In one or more embodiments of the articles described above, the public key is communicated with the article. The article of the preceding paragraph may further comprise instructions that, when executed, cause a system to decrypt secured user keys using the encryption key to extract user keys and use the user keys to decrypt secret code in the isolated memory region. The embodiments described in the previous paragraph may also be combined with one or more of the specifically disclosed alternatives in this paragraph.

Various embodiments of the present disclosure also include a method comprising the steps of generating an isolated memory region in a computing environment to store a code package where the isolated memory region is accessible only to code running in the isolated memory region, generating a signature using a private attestation key that corresponds to the computing environment, executing a verification process on the code package using the signature and a cryptographic digest of the code package, and communicating a verification result for the code package to a remote trusted component. The method of the preceding paragraph may further comprise the step of communicating a secured user key to transform secret code of the code package into the application code. The method of the preceding paragraph may further comprise the step of loading an encrypted code package into the isolated memory region. The method of the preceding paragraph may further comprise the step of generating an encryption key to secure communications between the application code and code running outside of the isolated memory region. The method of the preceding paragraph may further comprise the step of generating an encryption key to secure communications between the application code and code running outside of the isolated memory region. The method of the preceding paragraph may further comprise the step of processing a message comprising the signed data using a public key that corresponds to the computing environment and generating a verification result indicating whether a message originated from the trusted component in the isolated memory region. The embodiments described in the previous paragraph may also be combined with one or more of the specifically disclosed alternatives in this paragraph.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a logic circuit; and
logic operative on the logic circuit to generate computation data corresponding to execution of a set of computations within an isolated memory region of a computing environment, to secure the computation data using an encryption key to generate secured computation data, to secure the encryption key using a public key associated with code running outside of the isolated memory region, and to invoke a primitive of a primitive programming model to communicate the secured computation data and the secured encryption key to the code running outside of the isolated memory region, wherein the code running outside of the isolated memory distributes parallel processing jobs on the secured computation data, and the primitive programming model configures the isolated memory region with a secure communication channel to the code running outside of the isolated memory region.

2. The apparatus of claim 1, wherein the logic is further operative to process a signature of the secured computation data generated using a private key that is associated with the computing environment and invoke a primitive to communicate the secured computation data and the signature to a remote trusted component.

3. The apparatus of claim 1, wherein the logic is further operative to invoke a primitive function to generate the encryption key and another primitive function to generate a signature using the encryption key.

4. The apparatus of claim 1, wherein the logic is further operative to secure the encryption key with a public key that corresponds to a remote trusted component running on a remote machine.

5. The apparatus of claim 1, wherein the logic is further configured to generate a cryptographic digest of a code package on a distributed file system and use the cryptographic digest to verify a signature of the secured encryption key.

6. The apparatus of claim 1, wherein the logic is further operative to decrypt secured user keys using the encryption key to extract user keys and use the user keys to decrypt secret code in the isolated memory region.

7. The apparatus of claim 1, wherein the logic is further operative to process a communication primitive operative to invoke a function on untrusted code running outside of the isolated memory region or trusted code running inside the isolated memory region.

8. The apparatus of claim 1, the logic further operative to verify a signature of the secured computation data using a public attestation key and decrypt the secured encryption key to extract the encryption key.

9. An article comprising computer-readable storage hardware comprising instructions that, when executed, cause a system to:
   generate computation data corresponding to execution of a set of computations within an isolated memory region of a computing environment;
   secure the computation data using an encryption key to generate secured computation data;
   secure the encryption key using a public key associated with code running outside of the isolated memory region; and
   invoke a primitive of a primitive programming model to communicate the secured computation data and the secured encryption key to the code running outside of the isolated memory region, wherein the code running outside of the isolated memory distributes parallel processing jobs on the secured computation data, and the primitive programming model configures the isolated memory region with a secure communication channel to the code running outside of the isolated memory region.

10. The article of claim 9 further comprising instructions that, when executed, cause the system to process a signature of the secured computation data generated using a private key that is associated with the computing environment and invoke a primitive to communicate the secured computation data and the signature to a remote trusted component.

11. The article of claim 9 further comprising instructions that, when executed, cause the system to invoke a primitive function to generate the encryption key and another primitive function to generate a signature using the encryption key.

12. The article of claim 9 further comprising instructions that, when executed, cause the system to secure the encryption key with a public key that corresponds to a remote trusted component running on a remote machine.

13. The article of claim 12, wherein the public key is communicated with the article.

14. The article of claim 13, further comprising instructions that, when executed, cause the system to decrypt secured user keys using the encryption key to extract user keys and use the user keys to decrypt secret code in the isolated memory region.

15. A method, comprising:
   generating computation data corresponding to execution of a set of computations within an isolated memory region of a computing environment;
   securing the computation data using an encryption key to generate secured computation data,
   securing the encryption key using a public key associated with code running outside of the isolated memory region; and
   invoking a primitive of a primitive programming model to communicate the secured computation data and the secured encryption key to the code running outside of the isolated memory region, wherein the code running outside of the isolated memory distributes parallel processing jobs on the secured computation data, and the primitive programming model configures the isolated memory region with a secure communication channel to the code running outside of the isolated memory region.

16. The method of claim 15 further comprising processing a signature of the secured computation data generated using a private key that is associated with the computing environment and invoke a primitive to communicate the secured computation data and the signature to a remote trusted component.

17. The method of claim 15 further comprising invoking a primitive function to generate the encryption key and another primitive function to generate a signature using the encryption key.

18. The method of claim 15 further comprising securing the encryption key with a public key that corresponds to a remote trusted component running on a remote machine.

19. The method of claim 18 further comprising loading an encrypted code package into the isolated memory region.

20. The method of claim 15 further comprising decrypting secured user keys using the encryption key to extract user keys and using the user keys to decrypt secret code in the isolated memory region.

* * * * *